United States Patent [19]

Maclean et al.

[11] Patent Number: 4,792,896
[45] Date of Patent: Dec. 20, 1988

[54] STORAGE CONTROLLER EMULATOR PROVIDING TRANSPARENT RESOURCE SHARING IN A COMPUTER SYSTEM

[75] Inventors: William M. Maclean, Milton; Edward G. Agnew, Campbellville; Richard C. Madter, Puslinch, all of Canada

[73] Assignee: 516277 Ontario Limited, Ontario, Canada

[21] Appl. No.: 556,130

[22] Filed: Nov. 29, 1983

[51] Int. Cl.⁴ .................................. G06F 13/12
[52] U.S. Cl. ................................... 364/200
[58] Field of Search ... 364/200 MS File, 900 MS File

[56] References Cited

U.S. PATENT DOCUMENTS

| | | | |
|---|---|---|---|
| 3,975,712 | 8/1976 | Hepworth | 364/200 |
| 4,127,896 | 11/1978 | Raslavsky | 364/200 |
| 4,204,251 | 5/1980 | Brudevold | 364/200 |
| 4,295,205 | 10/1981 | Kunstadt | 364/900 |
| 4,303,990 | 12/1981 | Seipp | 364/900 |
| 4,399,503 | 8/1983 | Hawley | 364/200 |
| 4,399,504 | 8/1983 | Obermarck | 364/200 |
| 4,410,962 | 10/1983 | Daniels | 364/900 |
| 4,453,211 | 6/1984 | Askinazi | 364/200 |
| 4,456,971 | 6/1984 | Fukuda | 364/900 |
| 4,509,122 | 4/1985 | Agnew | 364/200 |
| 4,511,963 | 4/1985 | Kantner | 364/200 |
| 4,516,199 | 5/1985 | Frieder | 364/900 |
| 4,641,263 | 2/1987 | Perlman et al. | 364/900 |
| 4,642,759 | 2/1987 | Foster | 364/200 |

FOREIGN PATENT DOCUMENTS

| | | |
|---|---|---|
| 1106073 | 7/1981 | Canada . |
| 1124883 | 6/1982 | Canada . |
| 1124878 | 6/1982 | Canada . |
| 1145854 | 5/1983 | Canada . |

Primary Examiner—Archie E. Williams, Jr.
Assistant Examiner—Florin Munteanu
Attorney, Agent, or Firm—Kenyon & Kenyon

[57] ABSTRACT

A microprocessor controlled mass storage controller is used as an interface for mass storage devices which are shared by a plurality of stand-alone microcomputer systems. The microprocessor controlled mass storage controller has a system interface which maintains communications with a host microcomputer; a dedicated microprocessor which maintains the internal control of the controller and a network interface which maintains an access to the external network. Data transparency and integrity are achieved through the simulation by the controller of the mass storage device characteristics and responses.

6 Claims, 7 Drawing Sheets

NOTE: This part of the hardware is variable, and depends on the type of network being used.

STORAGE CONTROLLER EMULATOR PROVIDING TRANSPARENT RESOURCE SHARING IN A COMPUTER SYSTEM

The present invention relates to a device for transparent resource sharing in microcomputer systems, and more particularly relates to a microprocessor controlled mass storage controller which will enable microcomputer systems to access external mass storage devices and permit a transparent data transfer to the user.

BACKGROUND OF THE INVENTION

With widespread use of stand-alone microcomputers, the need to interconnect the individual computers and to share information and resources via networks has led to the development by numerous companies of many schemes and devices to make this sharing possible. However, to date, most, if not all, attempts in this area have been met with a fundamental problem. The problem is the requirement for modification of all operating system software packages to run on and accommodate the network system.

A typical microcomputer consists of a keyboard, a processing unit (which will include the central processor unit, memory, and various system control units), a display unit, and a mass storage system. In most cases the mass storage system will be a floppy disk drive system. The storage system usually consists of four parts: the system interface through which the system and the storage system communicate so that the system can send requests for service to the storage system and data can be transferred between the computer and the storage system; the controller (in essence a dedicated microprocessor) which interprets the system requests and executes the required operations to satisfy the requests; the mass storage device interface through which the controller interacts with the physical storage device; and the storage device itself.

In order for the operating software in a microcomputer to use the storage system, there are normally two interfaces—the low level hardware interface and a higher level software interface.

The low level hardware interface refers to the system interface mentioned above as being part of the storage system. Associated with the system interface is the protocol used so that commands and data can be successfully transferred between computer and controller. In most microcomputers the system interface is connected directly to the microcomputer bus, in which case the protocol is the same as is used to access other devices on the bus. However, the storage system may be external to the computer and interfaces to the computer in a different manner. In all cases there must be a well defined physical protocol in order for the computer to communicate with the storage system.

The higher level software interface refers to the way in which software is used to command the storage controller. The actual commands available; the order in which commands can be delivered; when data is to be transferred; and how status information can be examined are examples of the functions of the software interface. Software in the computer usually calls upon established routines ("device drivers") present in the computer (either in ROM or in the operating system) to handle the software interface. However, it is possible for software to perform its own interface if the program designer desires.

As an example, in most floppy disk systems, the hardware interface consists of a floppy disk controller module (FDC). This controller typically consists of a special purpose microprocessor control device. Communication between the FDC and the microcomputer processing unit is accomplished through a well defined protocol. This protocol varies between machines. In most cases the FDC is connected to the data/address/control bus of the microcomputer. Commands are passed to the FDC and data is transferred to and from the FDC using the protocol.

A disk is logically divided into concentric circular tracks, which are further subdivided into units called sectors. All operations performed with the disk are done in terms of these units. Typical operations include; read a sector or track, write a sector or track, and format a track. To perform the operations, the microcomputer processing unit addresses the FDC, passing it a command and any required data. The FDC will then execute the desired command. When finished, the FDC will signal the processor and provide status information, and possibly data if necessary.

Other mass storage systems are similar in concept to the floppy disk drive system.

Other network designers have attempted to replace the software interface in order to install their hardware into the computers. By replacing the existing device drivers with their own, the designers can make the network usable by other software that used the original device drivers. The problem with this method is that future releases of operating systems may include new software that is not compatible with past device drivers, thus requiring that the network designer rewrite the drivers for new releases. This technique of replacing software is called "patching" and has many inherent disadvantages, future incompatibility being just one. The other disadvantage to "patching" the operating system is that some application programs will supply their own device drivers, and therefore will not be able to use the network. Also, the user is dependent on the network supplier to furnish the patches for any operating system the user may desire to install in his system.

Background patent references of general interest are: U.S. Pat. No. 4,399,504 of Ronald L. Obermarck et al issued Aug. 16, 1983; U.S. Pat. No. 4,303,990 of William H. Seipp issued Dec. 1, 1981; U.S. Pat. No. 3,975,712 of Edward C. Hepworth et al issued Aug. 17, 1976; U.S. Pat. No. 4,399,503 of Kenneth R. Hawley issued Aug. 16, 1983; Canadian Pat. No. 1,124,883 of David A. Brereton et al issued June 1, 1982; Canadian Pat. No. 1,145,854 of John Vivian et al issued May 3, 1983; Canadian Pat. No. 1,124,878 of David A. Brereton et al issued June 1, 1982 and Canadian Pat. No. 1,106,073 of Richard A. Lemay et al issued July 28, 1981. Of particular interest is U.S. Pat. No. 4,399,504 of Obermarck et al which teaches a software method and means for sharing of data resources in a local multi-processing multi-programming environment by applications executing on one or more central electronic computer systems.

It is an object of the present invention to provide the capability of resource and information sharing from a network system of a microcomputer system, while at the same time avoiding the problem of the need to modify the software package for the operating system to run on and accommodate the network system. It is a further object of the present invention to provide a network interface for a stand-alone microcomputer which will be invisible to application programs, thereby enabling existing software to be run unchanged on the microcomputer network system. In this way the software base available to the user is not decreased in size as would be the case in adding to the software package to accommodate the network system.

It is a further object of the present invention to replace the storage system hardware of the microcomputer system with different interface hardware which will make the system interface function in the same manner as the original interface. In this way all past, present and future software designed to work with the original storage device will work with the hardware of the present invention.

SUMMARY OF THE INVENTION

According to the present invention there is provided a microprocessor controlled mass storage controller for coupling a host microcomputer system to a network configuration to provide transparent resource sharing. The microprocessor comprises a system interface means for transferring input and output commands from the microcomputer systems. A dedicated microprocessor means is provided, coupled to the system interface means for processing the commands to simulate the execution of the commands. The microprocessor further provides a network interface means coupled to the dedicated microprocessor and associated with the network configuration to transfer data to and from the network configuration on command from the dedicated microprocessor.

As well there is provided a method for providing resource sharing to a microcomputer with a system interface means, a dedicated microprocessor means and a network interface means, coupled to a network configuration. The method comprises accepting data from the microcomputer into the system interface means in a parallel data format, transferring the data to the network interface means and, if required, converting the data to a serial data format, and transmitting the data in appropriate format to the network configuration. Other data is received from the network configuration and, if necessary converted to a parallel data format and transferred in parallel format to the microcomputer. The characteristics and responses of a mass storage device are simulated by processing commands sent by the microprocessor and presenting the status to the microprocessor. Data is transmitted and received by the network interface means to and from the network configuration by executing network commands in the network interface means.

By replacing the existing hardware interface to a mass storage medium of a microcomputer with the hardware interface controller according to the present invention, the function of which is to interface with a communications network while at the same time retaining the same characteristics and responses as the original, no other portion (hardware or software) of the host computer need be changed in any way to enable that computer to operate on data from sources other than its originally intended storage medium. Since the main processor is totally unaware of any difference, the desired transparency is achieved. All past and future software designed to work with the storage system will thus work with the device according to the present invention.

BRIEF DESCRIPTION OF THE DRAWINGS

Other advantages and objects of the present invention will become apparent upon reading the following detailed description and upon referring to the drawings in which.

While the invention will be described in conjunction with example embodiments particular to a floppy disk application, it will be understood that it is not intended to limit the invention to such embodiments or such application. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 1:
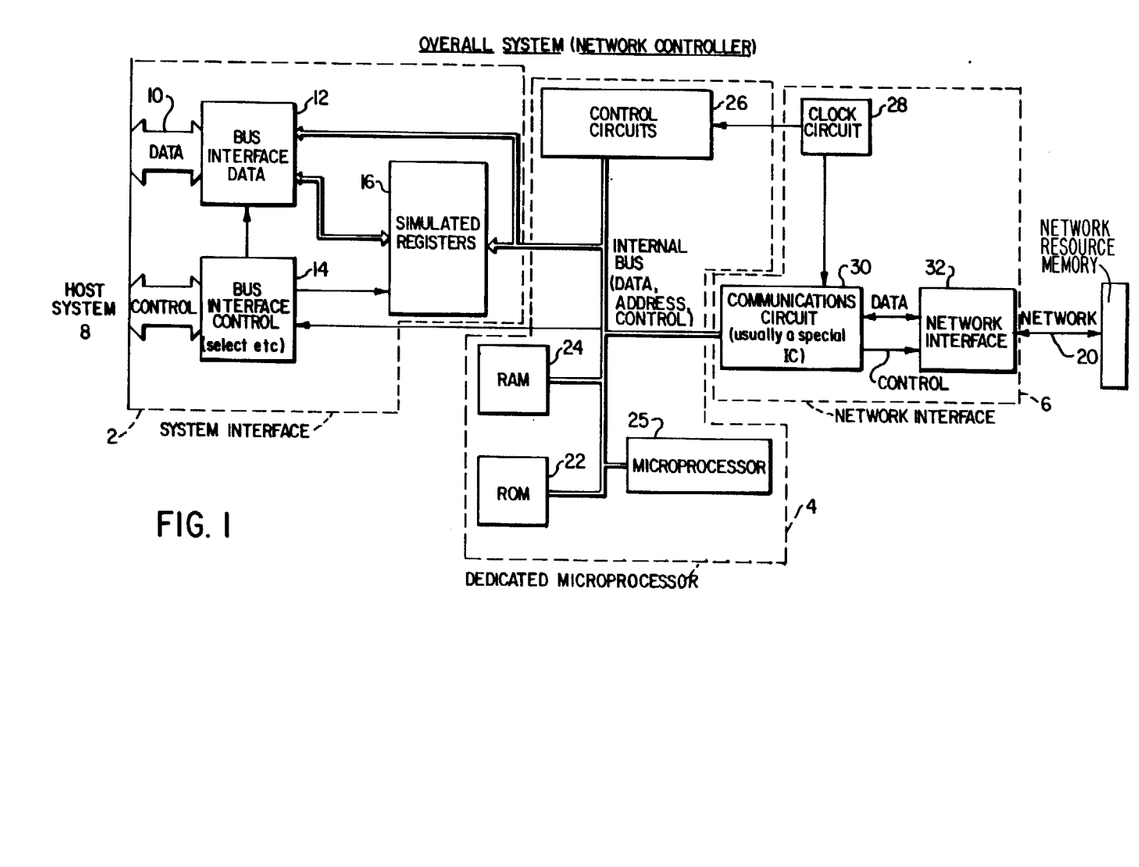
FIG. 1 is a block diagram of a transparent resource sharing device according to the present invention showing its main components.

Turning to FIG. 1 there is shown a block diagram of the components making up the transparent resource sharing controller device according to the present invention. The controller consists of three major units, a system interface 2, a dedicated control processor (microcomputer) 4 and a network interface 6.

System interface 2 is responsible for supporting communication with the host microcomputer shown generally as 8 in FIG. 1. It is connected to host microcomputer system 8 through data bus 10. The system interface 2 is capable of handling the protocol required by host system 8, and exactly simulates the characteristics and responses of the normal computer hardware which it replaces. The protocol typically consists of the following characteristics:

some way of addressing the interface module;
a data path so that the data can be transferred to/from the interface module;
various control signals used to transfer data in a controlled manner with a minimum of errors.

The important portions of the system interface are the bus interface data transceiver (data transceiver module) 12, the bus interface control circuit (control interface module) 14 and the simulated registers (register bank) 16.

Data transceiver 12 is enabled when data is to be transferred between the host system 8 and simulated registers 16, or between the control processor 4 and host system 8. The direction of operation of transceiver 12 is switchable and is selected according to the source and destination of the data.

Interface control circuit 14 will accept signals from the host system 8 and the dedicated control processor 4, and will transceive the required control signals needed to coordinate the operation of the data transceiver 12 and the registers 16. The interface control signals will therefore transceive signals used by the host system 8, the simulated register bank 16, the transceiver 12 and the control processor 4.

The simulated registers 16 are needed in order to fully simulate the original control or hardware. The number and function of the registers will vary of course according to the type of mass storage controller being replaced by the hardware according to the present invention. Some typical registers include data registers, status and control registers and registers to contain parameters of operation. In the device according to the present invention, these registers are present and behave in the same manner as the original controller. Also the control processor 4 is capable of accessing registers 16.

Figure 2:
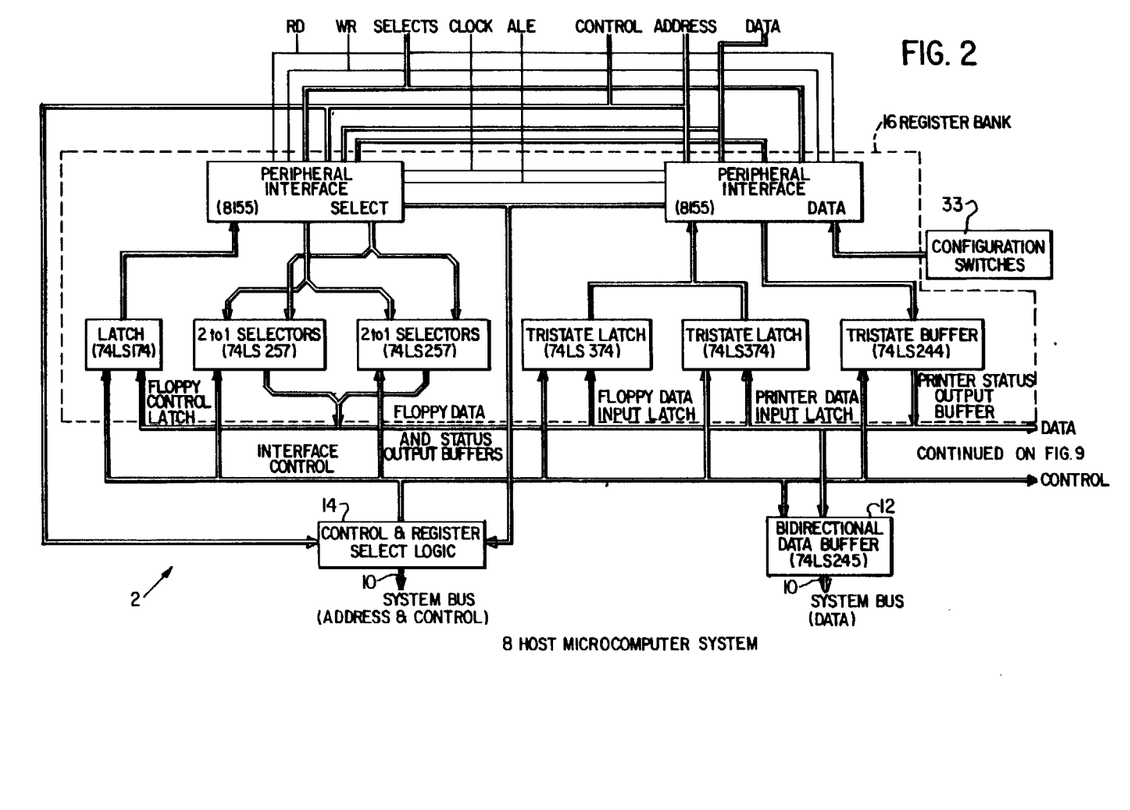
FIGS. 2, 3 and 4 respectively are more detailed block diagrams of specific components of the device of FIG. 1, namely, respectively, the system interface, dedicated microprocessor based controller and network interface respectively, these components being arranged for a floppy disk application of the invention.

A more detailed block diagram of system interface 2 and the interrelationship of its components, arranged for a floppy disk application, is shown in FIG. 2. It will be understood that the actual circuit of system interface 2 will depend on the mass storage device being simulated and the nature of the interface for any particular host system 8. The configuration switches 33 identify the address of the controller on the communication network plus other parameters. For any particular combination of storage device/host system, the system interface 2 is well defined. This interface however can obviously vary greatly between combinations.

Figure 3:
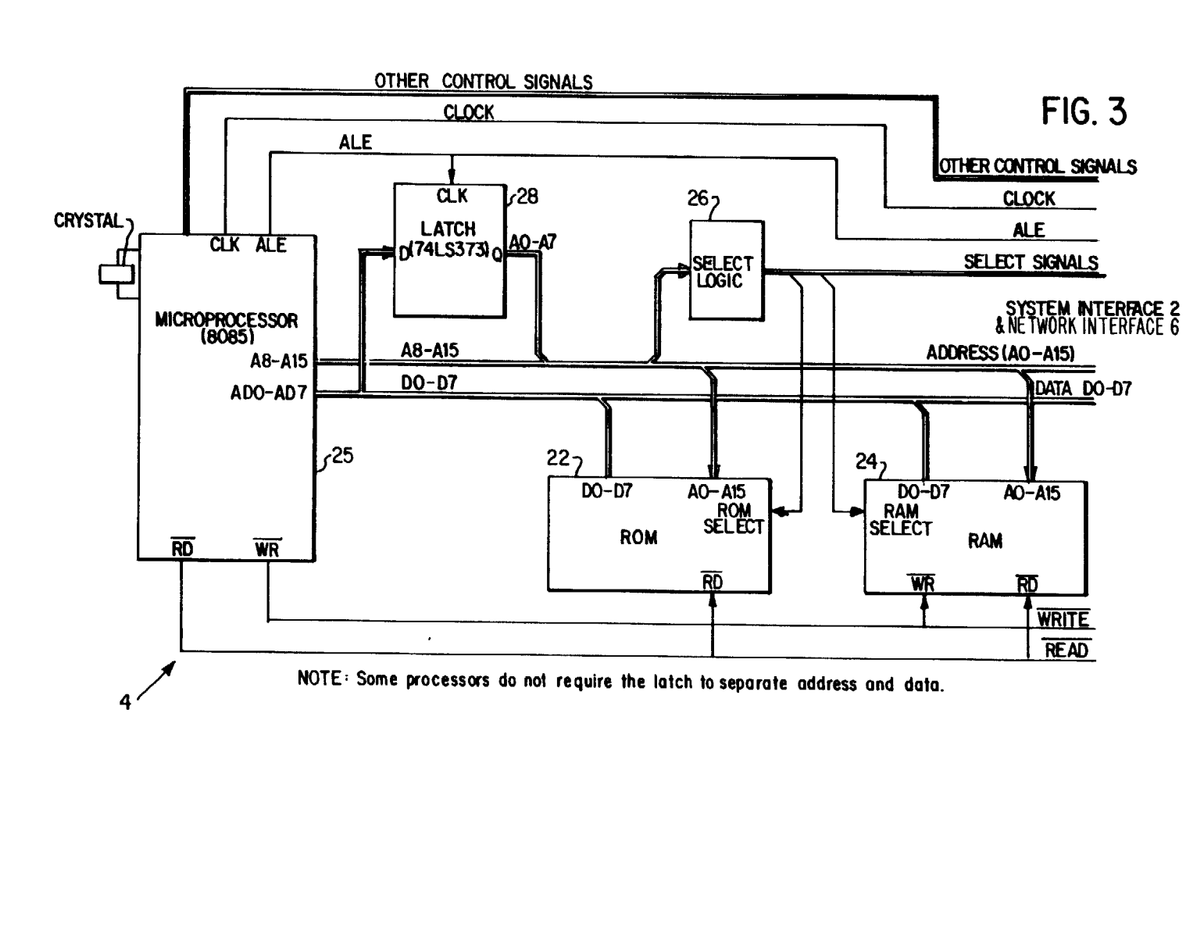

Turning to FIGS. 1 and 3, dedicated control processor 4 is responsible for receiving commands from the host system 8 via the system interface 2, and performs the required operations to simulate the execution of the commands, typically by accessing the network 20 to send/receive data, then returning status and optional data to the computer. In the device according to the present invention processor 4 is a dedicated microprocessor configured through the use of hardware and software to operate in the required manner. Such a microprocessor will normally incorporate ROM 22 (which will contain the firmware for the controller), RAM 24 (which will be used to hold temporary information and buffer data while being used) and associated control circuitry 26. The processor 4 may be configured as a one-chip microcomputer (containing RAM, ROM and microprocessor in one integrated circuit) or, as a number of separate integrated circuits. In the extreme case, it is possible for the control processor to be a custom made VLSI with the operating software hardwired into the chip.

Control circuitry 26 is necessary in order to coordinate the operation of processor 4 and allow control processor access to the registers 16 and the network interface 6. Also present in the control circuit 26 is a clock generation circuit 28.

As indicated, control processor 4 is in essence a small microcomputer. It is the installed software present in ROM 22 and the control circuits 26 that configure this computer for this particular application.

Figure 4:
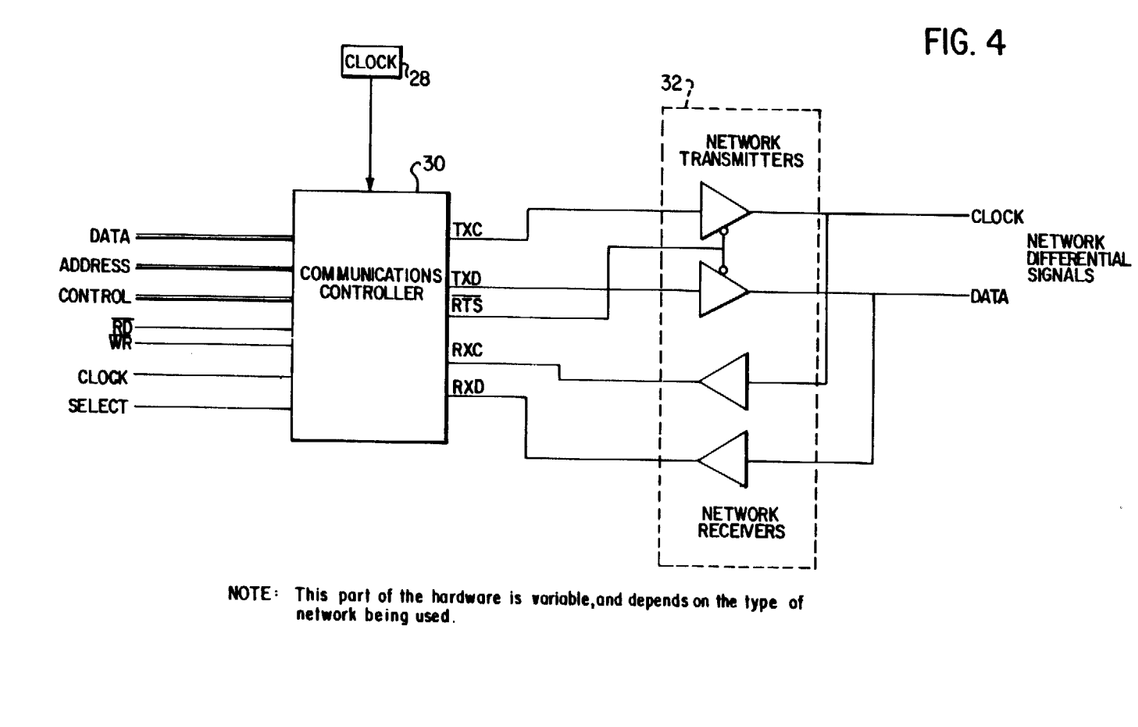

Turning to FIGS. 1 and 4, the network interface 6 is responsible for allowing the control processor 4 to access network 20. The actual network technology and protocols used are immaterial, as this side of the hardware is transparent to the computer 8. Typically, the network interface 6 will consist of two parts. One part will be responsible for handling the low level protocol of the network, such as packet size, device-to-device communication, and error detection. The other part will be the actual transmitter and receiver used to generate the required signal characteristics for the network 20.

In some systems, it may be desirable to use both the mass storage controller of the host system and the network controller of the device according to the present invention. This case will not be a problem if the host system will allow more than one storage controller to be present at a time. However, in those systems where only one such controller board is allowed at a time, an alternative solution is used. In these cases, the original controller hardware is modified so that the network controller according to the present invention can be interfaced to the original hardware directly. Instead of using the system interface according to the present invention to transfer data between the network controller and the host system, the interface already present on the original controller is used. By adding appropriate control circuitry and software to the device according to the present invention, it can be determined whether to use the actual mass storage device or the network. When the mass storage device is desired, the original controller is enabled in order to satisfy the host system request. Whenever the network is desired, the original controller is disabled and the device according to the present invention will perform the required functions.

It is possible to simulate more than one device at a time using the device in question. For example, a board has been developed which simulates a floppy disk controller and a printer port on the same board. To simulate more than one device the concepts are exactly the same as previously described herein, but the control circuitry and the software are more complex.

In addition to the transparency of the network controller device according to the present invention, it is also possible to write software that "knows" about the network and will take advantage of the network. It is therefore possible to write programs to use the network to its fullest, such as electronic mail, distributed data bases, network operating systems and the like. As well as simulating the operations of the mass storage device, the network interface 6 can also be capable of executing other commands which are particular to the network, thus allowing software designed to use the network to take advantage of the device according to the present invention.

EXAMPLE APPLICATIONS

First Application

An example application for this type of network controller device according to the present invention is that of a simple disk sharing facility. This network consists of a central computer, containing a network interface and floppy disk drives, and a number of computers without local disk drives connected to the network using the device according to the present invention which simulates floppy disk controllers. Whenever the software within the computers wants to access a floppy disk, the device according to the present invention will receive the commands from their host. The commands will then be relayed to the central computer to be acted upon. Results will be returned and passed on to the host.

In effect, therefore, the software within the computers operate as though there are floppy disk drives local to each computer, when in fact the drives are present in external computer systems. In this way, disks (and therefore data) can be shared.

Second Application

A single tape drive unit can be installed into a central computer. Other computers with the appropriate application of the device according to the present invention can be attached to the central computer. In this configuration all the other computers have access to the tape drive unit of the central computer as a back-up, but without the expense usually incurred by buying a tape drive unit for each user.

Third Application

In a more complex application, it is possible for a number of microcomputers, each containing its own combination of floppy disk drives/hard disks/tape drives, all networked together with a central unit also containing these types of storage devices. Each computer can be configured in a number of ways so that each user has available to him, his own local and remote working storage. Also working system software and application programs can be placed in the central unit so that all users have access to them. The above configuration allows for a very flexible resource sharing network with the capability of stand-alone operation as well.

Fourth Application

The floppy disk controller board in an IBM Personal Computer (or PCXT) (trade mark) can be replaced with the network interface device according to the present invention. A parallel printer port may be simulated on this device.

The network will be a simple bus or daisy-chained configuration with a central controlling IBM PCXT (trade mark) containing the floppy images that the slave computers will use. The floppy images are not physical floppies in most cases (although they can be), but are usually files kept on the central hard disk that are made to look like floppys through the use of a resident software within the controlling computer. A printer can be shared due to the simulated printer port, and printer output can be spooled within the central server so that the slave units are freed to perform other operations while the printer is busy.

As far as the slave units are concerned they have access to four floppy disk drives that appear to be local. However, whenever the computer attempts to access the floppy disk controller usually resisent, it will actually get the network controller device. Since that device will respond exactly like the original floppy disk controller, the software and the hardware within the slave computer will function properly without the need for changes. In fact slave units do not need to be running the same operating systems, even though they are connected to the same central server. For example, some slaves can be using PC-DOS 1.1 (Trade Mark), others using PC-DOS 2.0 (Trade Mark), CPM-86 (Trade Mark) or any other operating system available that is able to use the floppy disk drives.

Since the network controller card is transparent (because it exactly simulates the floppy disk controller), anything that is designed to be used on an IBM PC with disk drives (whether hardware or software) can still be used. Therefore, local hard disks are possible, as are RAM disks, communication devices, and even other networks from other manufacturers.

In addition to the above examples, a local floppy disk drive controller can be installed in the manner previously mentioned herein. The system interface on the device of the present invention is partially disabled so that it will not access the IBM system bus whenever the floppy disk controller does. Also the floppy disk controller integrated circuit on the controller board is taken out of that board and a small interface board is plugged in, in its place. The controller integrated circuit is placed into this interface board. The interface board is also connected to the device of the present invention via a cable. It is possible to configure the resulting system with a number of remote floppy disk drives and a number of local floppy disk drives up to a total of four drives. The hardware is capable of determining which drive is being accessed at any particular time and is therefore able to decide whether to use the actual floppy disk controller or to use the network. In any case the software and hardware in the computer will "see" all the floppys as being local devices.

Figure 5:
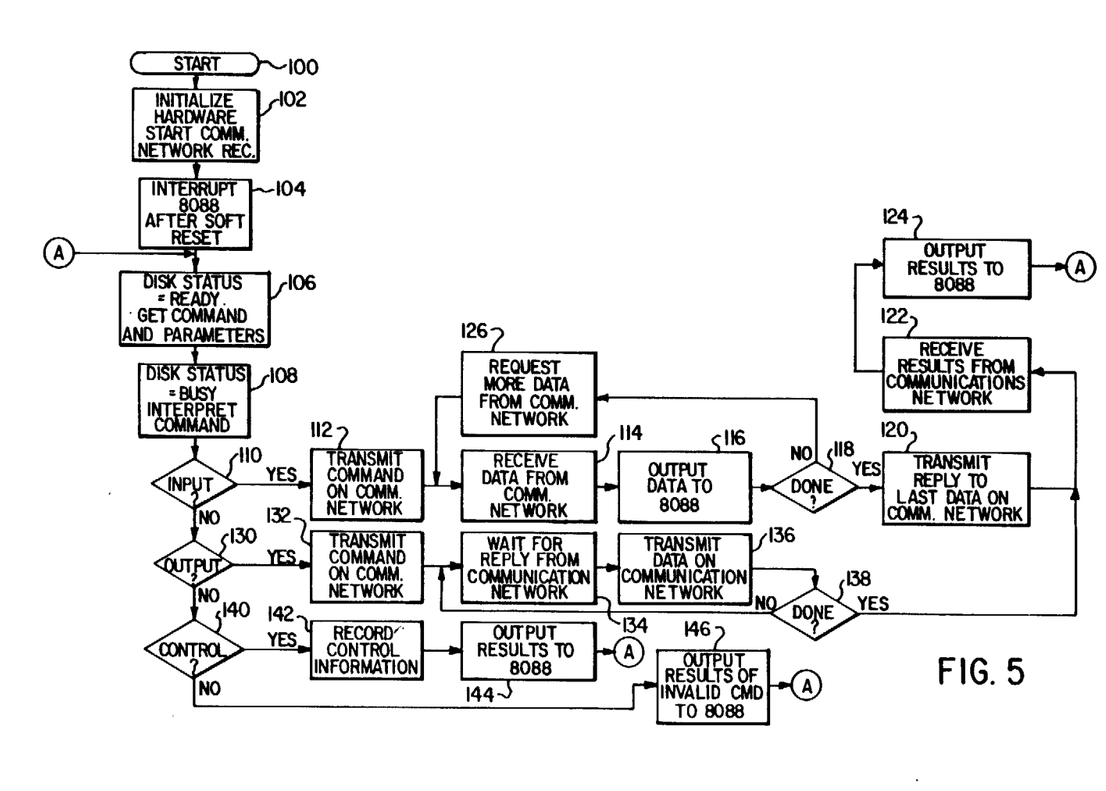
FIG. 5 is a logic flow diagram for the internal software that controls the dedicated processor 4 of FIG. 1.

FIG. 5 is a logic flow diagram of the sequence of events that takes place for the control of the dedicated microprocessor 25 in FIG. 3. The instructions are loaded from the Read Only Memory (ROM) 22 in FIG. 3 into the microprocessor 25. Upon receipt of a request from the host system at start step 100, the microprocessor executes instructions to initialize hardware and to start communication network functions. At step 102 the microprocessor 25 sends an interrupt to the host system after all the simulated register 16, in FIG. 2 have been reset. At step 106 the disk status in the register bank 16 is set to READY state, the command and parameters which are sent from the host system are fetched from the system interface 2 to the microprocessor at step 108 the disk status in the register bank 16 is set to BUSY state and the microprocessor 25 executes instructions from ROM 22 to interpret the command. Upon receipt an INPUT command from the host microcomputer at step 110, the microprocessor 25 executes instructions from ROM 22 to transmit a RECEIVE command on the communication network at step 112 and set Random Access Memory (RAM) 24 ready to receive data from communication network at step 114. At step 116 the data is formated to the form recognizable by the host system 2 and then output to the host system through the system interface 2 until no more data is required by the host system. At step 120 upon sending the last data to the host microcomputer, the microprocessor executes a command to reply to the communication network with a LAST DATA signal. At step 122, the microprocessor receives the results from the communication network and outputs them to the host microcomputer through the system interface 2 at step 124. Then returns to step 106 waiting to process further commands from the host microcomputer. At step 130, upon receipt of an output command, the microprocessor 25 at step 132 executes instructions resident in the ROM 22 to transmit a TRANSMIT command to the communication network and waits for the reply status from the communication network at step 134. Upon receipt of the replay status from the communication network, at step 136 the microprocessor executes instructions to transmit data to the communication network until the last data has been sent at step 138. At the end of the transmission the microprocessor resets itself to step 122. At step 140, upon receipt of a control command, the microprocessor 25 records the control information in the RAM 24 at step 142 and outputs the results to the host system at step 144 and returns to step 106 waiting for further command to be processed.

Figure 6:
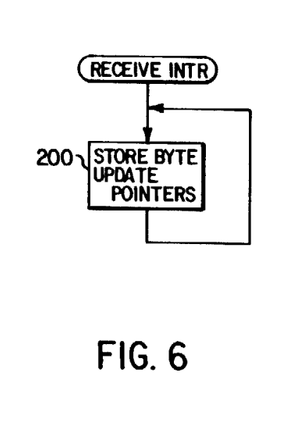
FIG. 6 is a logic flow diagram for the processing of a RECEIVE-INTERRUPT request.

FIG. 6 is a logic flow diagram of the sequence of events that takes place in a RECEIVE-INTERRUPT request. At step 200, upon receipt of the receive-interrupt request, the microprocessor 25 executes routines resident in ROM 22 to store the data byte in RAM 24 and updates the pointer for the RAM 24.

Figure 7:
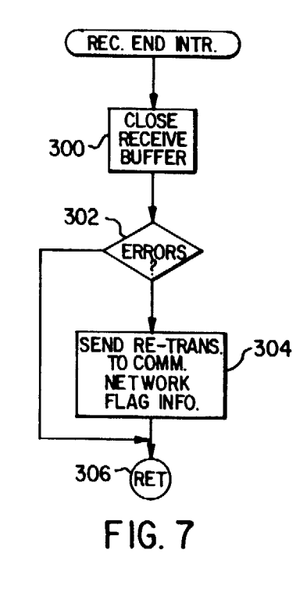
FIG. 7 is a logic flow diagram for the processing of a RECEIVE-END-INTERRUPT request.

Turning to FIG. 7 is a logic flow diagram of the sequence of events that take place in a RECEIVE-END-INTERRUPT request. At step 300 the microprocessor 25 executes routines in ROM 22 to set a end of data indicator on the receive buffer in the RAM 24. At step 302, the microprocessor 25 verifies for receive errors, and when no error has been detected the RECEIVE-END-INTERRUPT request returns control to the calling routine at step 306. At step 304 when errors have been detected, the microprocessor 25 executes routines in ROM 22 to send RE-TRANSMIT request to the communication network, flags the information in the RAM 24 and then returns control to the calling routine at step 306.

Figure 8:
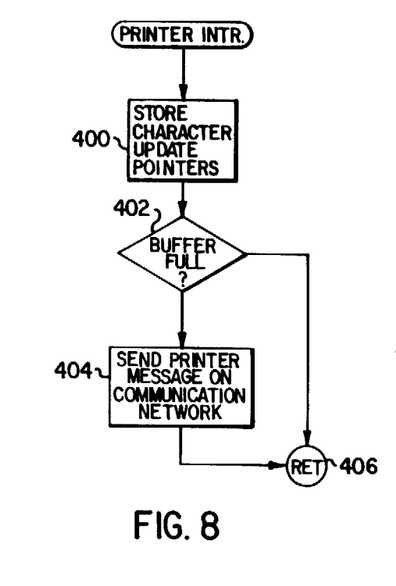
FIG. 8 is a logic flow diagram for the processing of a PRINTER-INTERRUPT request.

Turning to FIG. 8, is a logic flow diagram of the sequence of events that take place in a PRINTER INTERRUPT request. At step 400, the microprocessor stores the data in the RAM 24 and updates the printer for the RAM 24. At step 402 the microprocessor 25 returns control to the calling routine when the RAM 24 is not full and sends a printer message to the communication network when the RAM 24 is full then returns control to the calling routine in step 406.

Figure 9:
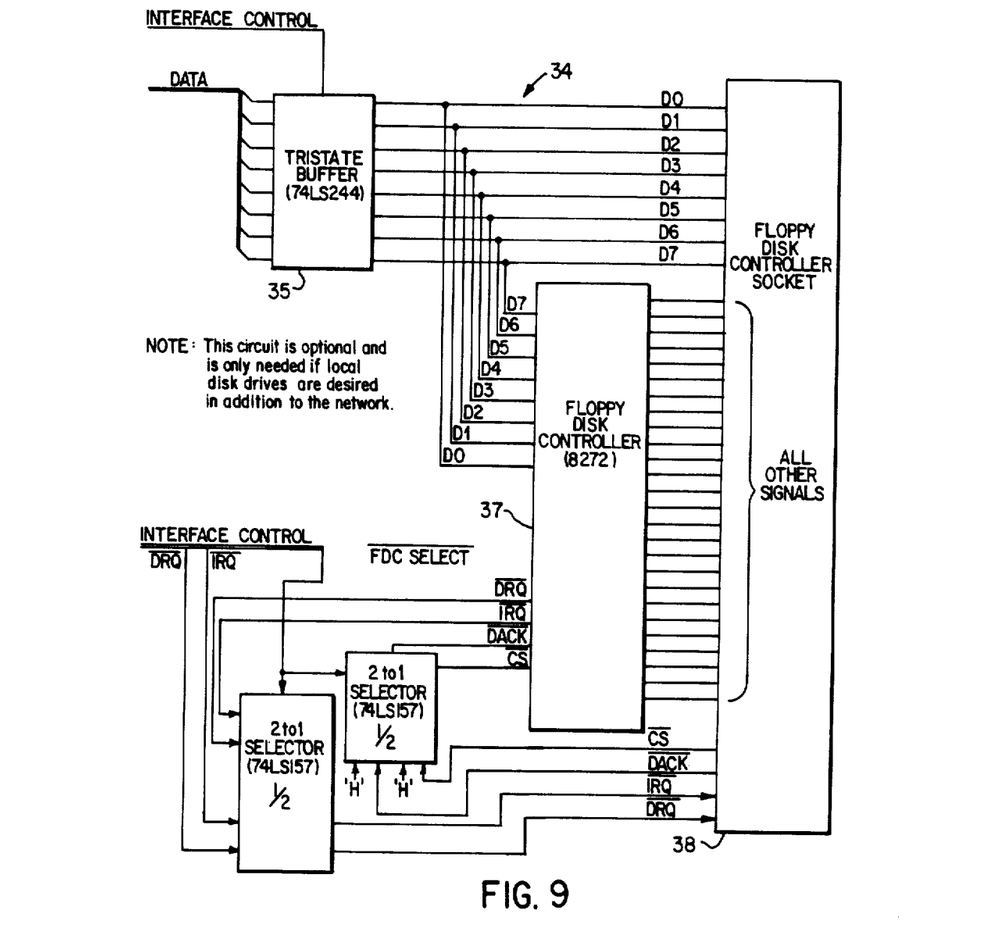
FIG. 9 is a circuit diagram of an optional interface for the connection of a local storage device in addition to the simulated transparent mass storage.

Turning to FIG. 9, there is shown a circuit diagram of an optional interface 34 for the connection of a local storage device in addition to the simulated transparent mass storage. The mass storage device controller 37, for example a floppy disk controller, is moved from the socket on the floppy disk controller to the interface 34. The floppy disk controller socket 38 is then used for the physical connection of interface 34 to the floppy disk controller board.

The tristate buffer 35 provides the interface for data between the system interface 2 and the floppy disk controller. The 2 to 1 selector 36 selects between the simulated or local floppy disks by the appropriate routing of the control signals (CS, DACK, IRQ, DRQ).

In this way, the interface 34 can selectively enable or disable the local floppy disk controller from the host microcomputer system.

It is important to realize that the present invention provides hardware, in the form of an integrated circuit board, which replaces the standard floppy disk controller of a microcomputer with a network communications device. The system interface 2, of this device, is determined by the host system for which the particular board is being used. Once the particular system has been specified, the interface is fairly specific. However this is only true on the system side of the interface. The other side of this interface will be decided by what registers 16 are being simulated and on the configuration of the internal controlling microprocessor 25.

Even less specific is the configuration of the network interface 6. The type of network and the protocol used will determine what the interface looks like. If the interface is fairly complex, then the general block diagram will remain as shown in FIGS. 1 and 4. If however the network is fairly simple, it is possible to remove the communications circuit 30 and to perform its functions in software.

The actual network interface 32 can be increased in complexity or decreased in complexity by using less or more software respectively. At one end of the extreme, it is possible for the network controller device according to the present invention to be more complex than the one indicated here, by removing the dedicated microprocessor 25 and its software and using discreet hardware instead. Or, the control functions may be incorporated into a custom made integrated circuit which may be either a microprocessor itself or a hardware solution. At the other extreme it is possible to remove a lot of the hardware by performing as many functions as possible by software.

Thus there has been provided in accordance with the present invention a device for transparent resource sharing in microcomputer systems that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention:

1. A microprocessor controlled mass storage controller simulator for coupling a single microprocessor functioning as a central processing unit in a host microcomputer system, the host system normally being coupled by a mass storage controller to a local resource memory means, to a network having at least one network resource memory means connected to means for transmitting and receiving data from the mass storage controller simulator comprising a system interface for transferring input and output commands and data to and from the host microcomputer system, such commands and data normally being used by the mass storage controller to control operation of the local resource memory means, said system interface comprising a control interface module coupled to a data transceiver module and the host microcomputer system to generate control signals for the host microcomputer system, and a register bank coupled to said control interface module to provide storage for simulating a mass storage device status, said register bank module comprising a tristate floppy data latch coupled to a peripheral data interface and said data transceiver module, and a printer tristate status buffer coupled to said peripheral data interface and said data transceiver module;

a dedicated microprocessor coupled to the system interface for emulating the interface between the microcomputer system and the mass storage controller by receiving the input and output commands and data from the host microcomputer system and generating responses thereto in the same manner as the mass storage controller; and a network interface coupled to said dedicated microprocessor and coupled with the network means for transmitting and receiving data to transfer data to and from the network resource memory means in response to commands from the dedicated microprocessor.

2. A microprocessor controlled mass controller simulator as set forth in claim 1 wherein said dedicated microprocessor includes a bus and a clock generating circuit and wherein said network interface means includes a communications circuit coupled to said bus and said clock generating circuit to generate network control and data signals for the network.

3. A microprocessor controlled mass controller simulator as set forth in claim 2 wherein said network interface means further includes a network circuit coupled to said communications circuit for providing an electrical interface with the network.

4. A microprocessor controlled mass storage controller simulator as recited in claim 1 wherein said register bank further comprises a latch circuitry coupled to a peripheral select interface and the control interface module; a two-to-one printer status selector coupled to the peripheral select interface and the control interface module; a two-to-one floppy status selector coupled to the peripheral select interface, the two-to-one printer status selector and the control interface module, in which the two-to-one status selectors are responsive to select signals generated by the dedicated microprocessor and the control interface module.

5. A microprocessor controlled mass storage controller simulator for coupling a single microprocessor functioning as a central processing unit in a host microcomputer system, the host system normally being coupled by a mass storage controller to a local resource memory means, to a network having at least one network resource memory means connected to means for transmitting and receiving data from the mass storage controller simulator comprising
- a system interface for transferring input and output commands and data to and from the host microcomputer system, such commands and data normally being used by the mass storage controller to control operation of the local resource memory means, said system interface comprising a control interface module coupled to a data transceiver module and the host microcomputer system to generate control signals for the host microcomputer system, and a register bank coupled to said control interface module to provide storage for simulating a mass storage device status, said register bank comprising a floppy control latch coupled to a peripheral select interface and said control interface module, a two-to-one floppy data selector buffer coupled to said peripheral select interface and said control interface module; and a two-to-one floppy status selector buffer coupled to said peripheral select interface and the control interface module in which the two-to-one selector buffers are responsive to signals generated by the dedicated microprocessor and the control interface module;
- a dedicated microprocessor coupled to the system interface for emulating the interface between the host microcomputer system and the mass storage controller by receiving the input and output commands and data from the host microcomputer system and generating responses thereto in the same manner as the mass storage controller; and
- a network interface coupled to the said dedicated microprocessor means and coupled with the network means for transmitting and receiving data to transfer data to and from the network resource memory means in response to commands from the dedicated microprocessor means.

6. A microprocessor controlled mass storage controller simulator for coupling a single microprocessor functioning as a central processing unit in a host microcomputer system, the host system normally being coupled by a mass storage controller to a local resource memory means, to a network having at least one network resource memory means connected to means for transmitting and receiving data from the mass storage controller simulator comprising
- a system interface means for transferring input and output commands and data to and from the host microcomputer system, such commands and data normally being used by the mass storage controller to control operation of the local resource memory means;
- a dedicated microprocessor means coupled to the system interface means for emulating the interface between the microcomputer system and the mass storage controller by receiving the input and output commands and data from the microcomputer system and generating responses thereto in the same manner as the mass storage controller, said dedicated microprocessor means comprising a microprocessor chip for executing instructions, a Random Access Memory (RAM) means for buffering data to be transferred between the system interface and the network interface and for storing temporary control information;
- control circuitry for generating control and select signals to selectively coordinate the operation of the dedicated microprocessor with the RAM, system interface and network interface, and a clock generating circuitry coupled to said control circuitry for controlling data transfers of the dedicated microprocessor; and
- a network interface coupled to the dedicated microprocessor means and coupled with the network means for transmitting and receiving data to transfer data to and from the network resource memory means in response to commands from the dedicated microprocessor means.

* * * * *

UNITED STATES PATENT AND TRADEMARK OFFICE
CERTIFICATE OF CORRECTION

PATENT NO. : 4,792,896
DATED : Dec. 20, 1988
INVENTOR(S) : William M. Maclean

It is certified that error appears in the above-identified patent and that said Letters Patent is hereby corrected as shown below:

```
Column 1, line 9 change "controller" to -processor-
Column 1, line 53 "interfaces" should be -interfaced-
Column 5, line 40 "computer" should be -host system-
Column 5, line 56 "of processor" should be -of control processor-
Column 5, line 56 "control" should be -controlled-
Column 5, line 57 "processor access" should be -access-
Column 7, line 48 "resisent" should be -resident-
Column 8, line 28 "register" should be -registers-
Column 8, line 36 "an" should be -of an-
Column 8, line 51 "Tnen" should be -Tnen it-
Column 9, line 7 cancel "Turning to"
Column 9, line 21 cancel "Turning to".
Column 9, line 56 "what" should be -which-
```

Signed and Sealed this

Third Day of October, 1989

Attest:

DONALD J. QUIGG

*Attesting Officer*    *Commissioner of Patents and Trademarks*